United States Patent
Karnalkar et al.

(10) Patent No.: US 10,769,709 B2
(45) Date of Patent: Sep. 8, 2020

(54) SYSTEM AND APPARATUS FOR MANAGING TASKS

(71) Applicant: AT&T Intellectual Property I, L.P., Atlanta, GA (US)

(72) Inventors: Anup D. Karnalkar, Allen, TX (US); R. Tyler Wallis, Greenwood Village, CO (US); William S. Robbins, Sun Prairie, WI (US); Susan S. Steele, Phillipsburg, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 185 days.

(21) Appl. No.: 15/808,062

(22) Filed: Nov. 9, 2017

(65) Prior Publication Data

US 2018/0075517 A1    Mar. 15, 2018

Related U.S. Application Data (60) Division of application No. 13/410,510, filed on Mar. 2, 2012, now Pat. No. 9,842,360, which is a continuation of application No. 12/851,066, filed on Aug. 5, 2010, now Pat. No. 8,156,009, which is a continuation of application No. 12/275,702, filed on Nov. 21, 2008, now Pat. No. 7,801,774.

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0633* (2013.01); *G06Q 30/0207* (2013.01); *G06Q 30/0601* (2013.01); *G06Q 30/0603* (2013.01); *G06Q 30/0639* (2013.01)

(58) Field of Classification Search
CPC .................................................. G06Q 30/0633
See application file for complete search history.

(56) References Cited

U.S. PATENT DOCUMENTS

| | | |
|---|---|---|
| 7,171,377 B2 | 1/2007 | Ogasawara |
| 7,227,498 B2 | 6/2007 | Soliman |
| 2002/0026363 A1 | 2/2002 | Dunaway |

(Continued)

OTHER PUBLICATIONS

"Safeway.com—The Next Generation of On-Line Grocery Shopping Unvelived", Business Wire, Mar. 13, 2002, 4 pages.

(Continued)

*Primary Examiner* — Kathleen Palavecino
(74) *Attorney, Agent, or Firm* — Guntin & Gust, PLC; Matthew Tropper (57) ABSTRACT

A system that incorporates teachings of the present disclosure may include, for example, a communication device having a controller to present a plurality of selectable commodity items, detect one or more selections from the plurality of commodity items, generate a list from the one or more commodity items selected, and transmit the list to a system. The system can be adapted to receive the list from the communication device, determine a selection order for the items in the list based on a location of each item in a store and at least one characteristic of at least one of the items, update the list according to the selection order, and transmit the updated list to a device for conducting commodity shopping according to the adjusted list. Other embodiments are disclosed.

20 Claims, 6 Drawing Sheets

(56) References Cited

U.S. PATENT DOCUMENTS

| | | |
|---|---|---|
| 2002/0158133 A1 | 10/2002 | Conzola et al. |
| 2002/0161658 A1 | 10/2002 | Sussman |
| 2003/0004831 A1 | 1/2003 | Owens |
| 2003/0065575 A1 | 4/2003 | Berkema |
| 2004/0100380 A1 | 5/2004 | Lindsay et al. |
| 2005/0189415 A1 | 9/2005 | Fano et al. |
| 2006/0059049 A1 | 3/2006 | Morris et al. |
| 2007/0088852 A1 | 4/2007 | Levkovitz |
| 2008/0052243 A1 | 2/2008 | Narayanaswami et al. |
| 2008/0198012 A1 | 8/2008 | Kamen |
| 2009/0106085 A1* | 4/2009 | Raimbeault .......... G06Q 20/208 705/14.44 |
| 2009/0125394 A1 | 5/2009 | Otto |
| 2009/0150251 A1 | 6/2009 | Zhitomirsky |

OTHER PUBLICATIONS

"The Grocery Cart in your PC", Business Week, Sep. 11, 1995, 63+.

\* cited by examiner

SYSTEM AND APPARATUS FOR MANAGING TASKS

CROSS REFERENCE TO RELATED APPLICATIONS

This application is a divisional of U.S. patent application Ser. No. 13/410,510, filed Mar. 2, 2012, which is a continuation of U.S. patent application Ser. No. 12/851,066, filed Aug. 5, 2010, now U.S. Pat. No. 8,156,009, which is a continuation of U.S. patent application Ser. No. 12/275,702, filed Nov. 21, 2008, now U.S. Pat. No. 7,801,774. The contents of each of the foregoing is/are hereby incorporated by reference into this application as if set forth herein in full.

FIELD OF THE DISCLOSURE

The present disclosure relates generally to communication techniques and more specifically to a system and apparatus for managing tasks.

BACKGROUND

In today's busy environment, it is common to forget tasks or items of necessity. Some consumers rely on habits and routines to help them remember food items while grocery shopping. Other consumers who rely less on memory create a written list of food items before they go to the grocery store. Yet other consumers use more sophisticated techniques such as a calendar application to generate notices to manage and itemize tasks.

DETAILED DESCRIPTION

One embodiment of the present disclosure can entail a system having a controller to receive a grocery list from a communication device of a user, identify a location in a store for each item in the grocery list, determine a selection order for the items in the grocery list based on the identified location of each item, adjust the grocery list according to the selection order and the location of each item, and transmit the adjusted grocery list to a device in the store for conducting grocery shopping according to the adjusted grocery list.

Another embodiment of the present disclosure can entail a computer-readable storage medium having computer instructions to receive a grocery list from a communication device of a user, determine a selection order for the items in the grocery list based on a location of each item in a store, identify one or more promotions associated with items on the grocery list, update the grocery list according to the selection order, the location of each item, and the one or more promotions, and transmit the updated grocery list to a device for conducting grocery shopping according to the adjusted grocery list.

Yet another embodiment of the present disclosure can entail a communication device having a controller to present a user a plurality of meal options, detect one or more selections by the user from the plurality of meal options, generate a grocery list from the one or more meal options selected, and transmit the grocery list to a system. The system can be adapted to receive the grocery list from the communication device, determine a selection order for the items in the grocery list based on a location of each item in a store, update the grocery list according to the selection order and the location of each item, and transmit the updated grocery list to a device for conducting grocery shopping according to the adjusted grocery list.

Another embodiment of the present disclosure can entail a device having a controller to receive a grocery list with a selection order for items in the grocery list and a location of each item in a store, receive a selection of an item in the grocery list, determine the location of the item in the store, and present a user the item and one or more navigation instructions to locate the item in the store.

Another embodiment of the present disclosure can entail receiving a list of shopping items, determining a selection order for the items in the shopping list based on a location of each item in a store, updating the received list of shopping items according to the selection order and the location of each item, and transmitting the updated shopping list to a device to shop for the items in the store according to the updated list of shopping items.

Figure 1:
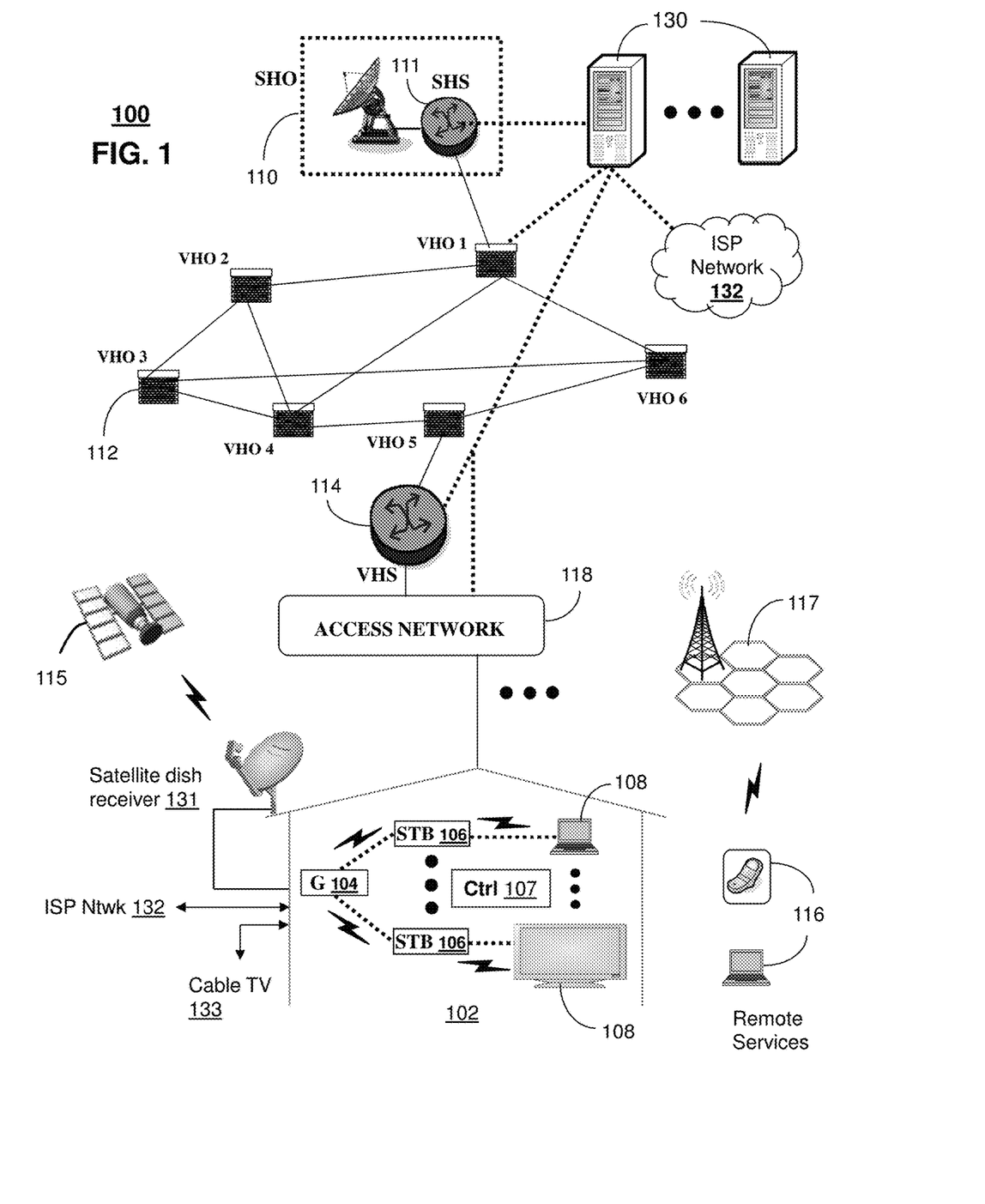
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 114 can represent a group of digital subscriber line access multiplexers (DSLAMs) located in a central office or a service area interface that provide broadband services over optical links or copper twisted pairs to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

Figure 5:
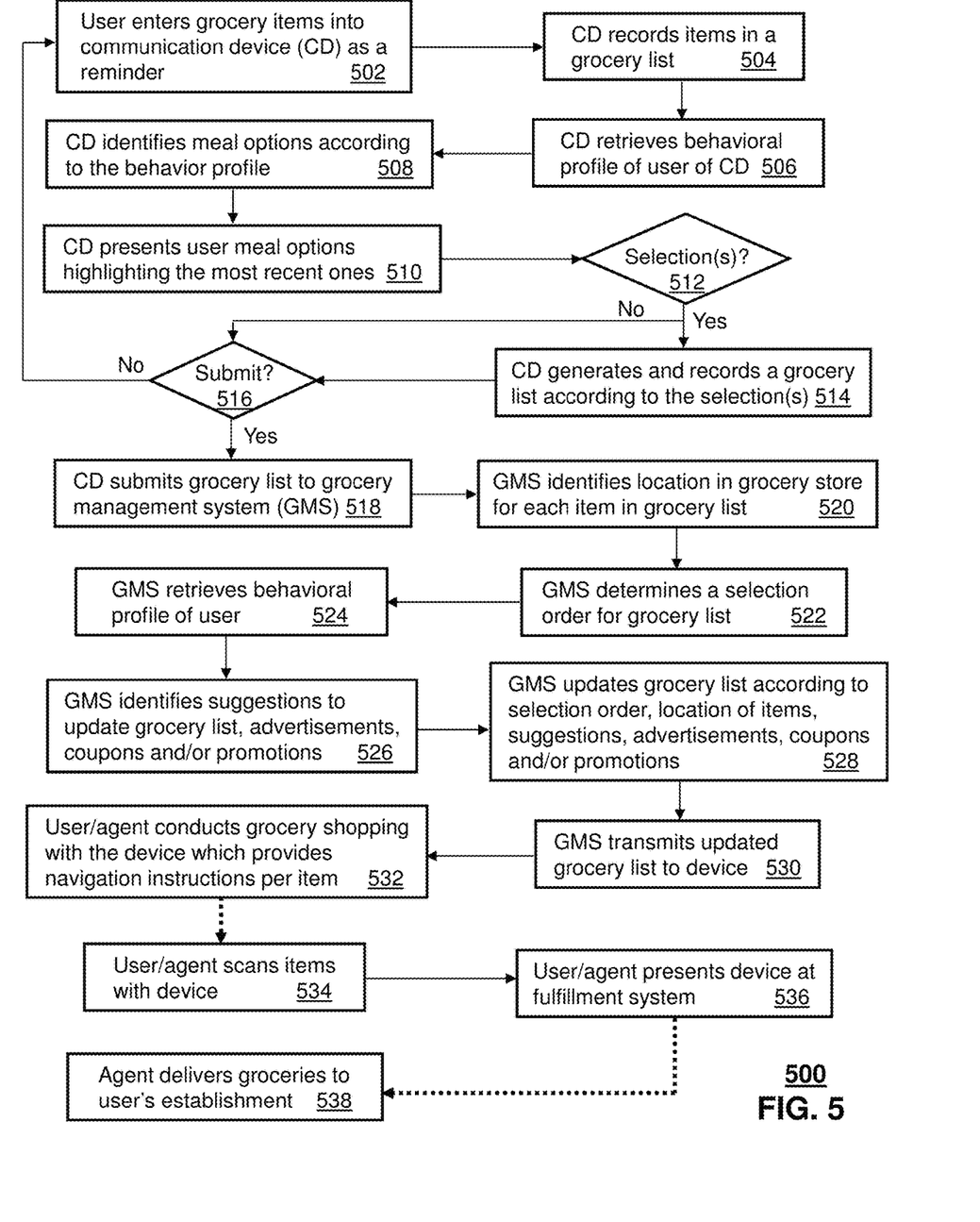
FIG. 5 depicts an illustrative embodiment of a method according to the present disclosure.

Another distinct portion of the computing devices 130 can represent a grocery management system (herein referred to as GMS 130) that manages grocery shopping tasks for users as described in the flowchart of FIG. 5. The GMS 130 can be accessed by any of the communication devices of FIG. 1 (e.g., the STB 106, computer 108, cellular phone 116, etc.).

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive media content services.

Figure 2:
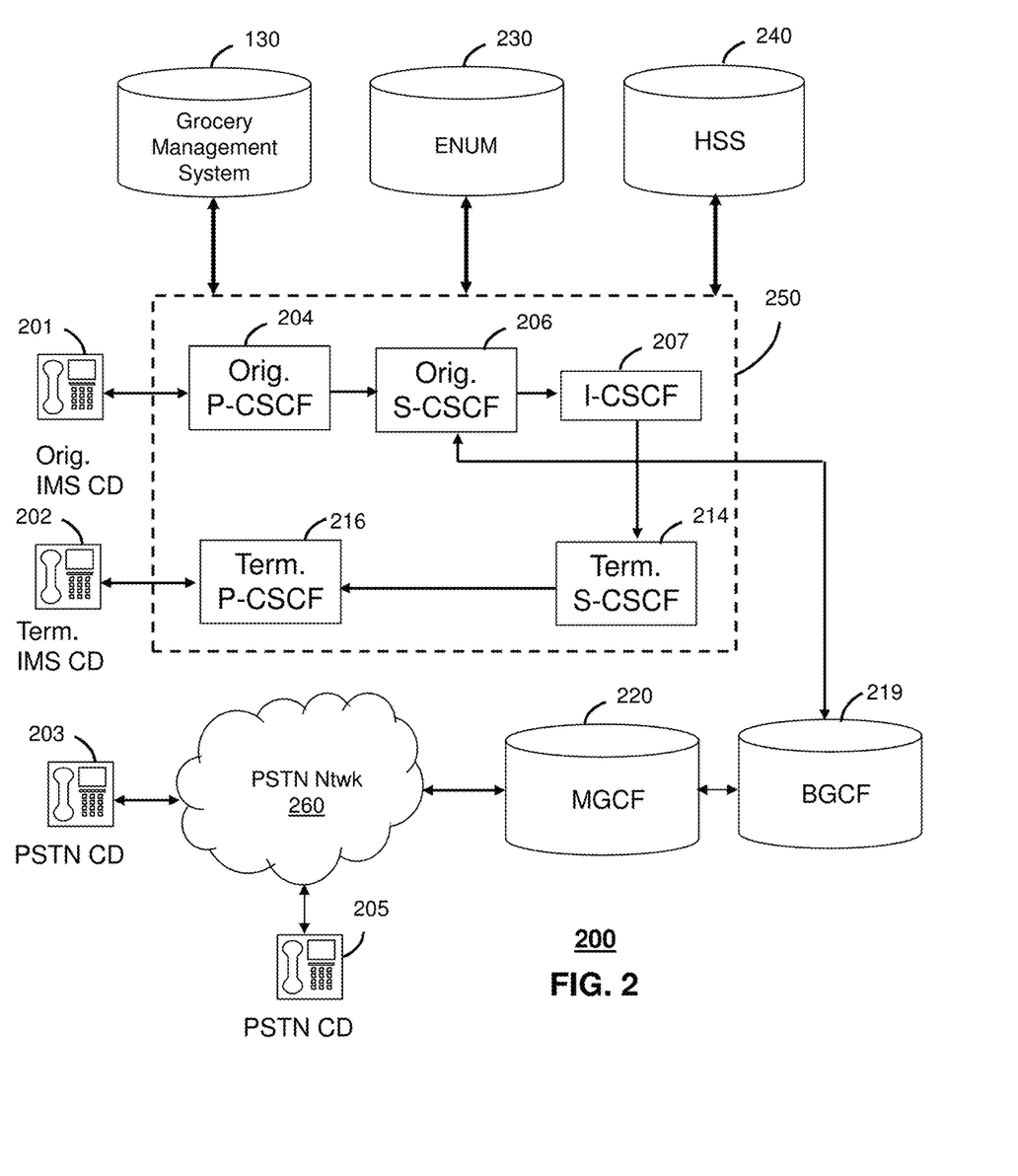

FIG. 2 depicts an illustrative embodiment of a communication system 200. employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing by way of common protocols such as H.323. In addition, communication system 200 can be adapted to provide the IMS CDs 201, 203 the multimedia and Internet services of communication system 100.

The GMS 130 of FIG. 1 can be operably coupled to the second communication system 200 for purposes similar to those described above.

Figure 3:
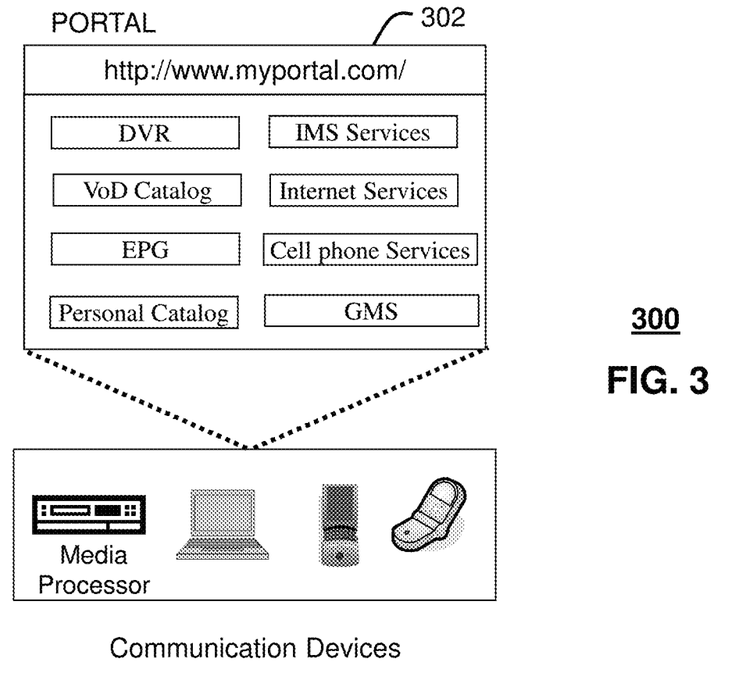
FIG. 3 depicts an illustrative embodiment of a portal interacting with the communication systems of FIGS. 1-2.

FIG. 3 depicts an illustrative embodiment of a portal 302 which can operate from the computing devices 130 described earlier of communication 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, provisioning services of the GMS 130 discussed above, and so on.

Figure 4:
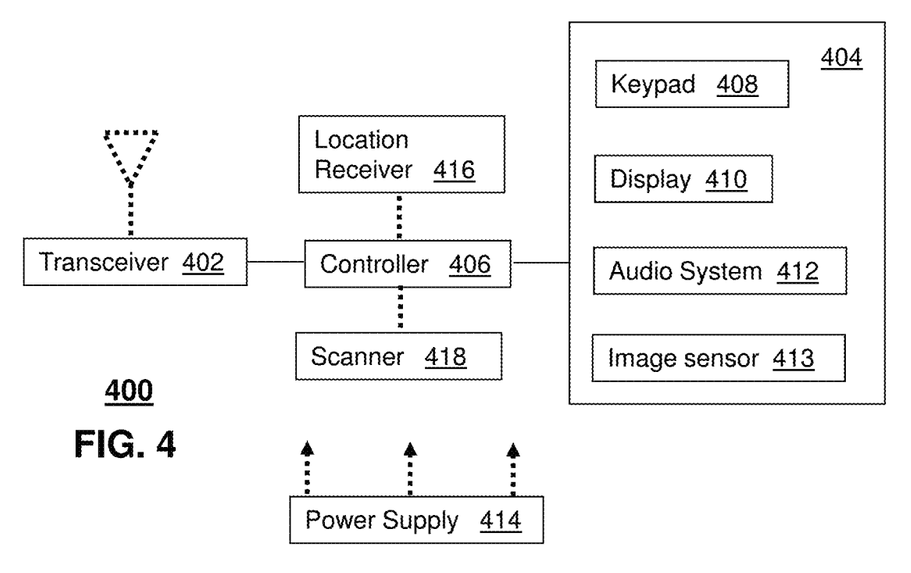
FIG. 4 depicts an illustrative embodiment of a communication device utilized in the communication systems of FIGS. 1-2.

FIG. 4 depicts an exemplary embodiment of a communication device 400. Communication 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, a scanner 418, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 100 based on signals generated by a constellation of GPS satellites, thereby facilitating common location services such as navigation. The scanner 418 can utilize common barcode scanning technology for scanning an item with a barcode, and conveying the information to a fulfillment system (such as a point of sale terminal) for purchasing a product. The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 6:
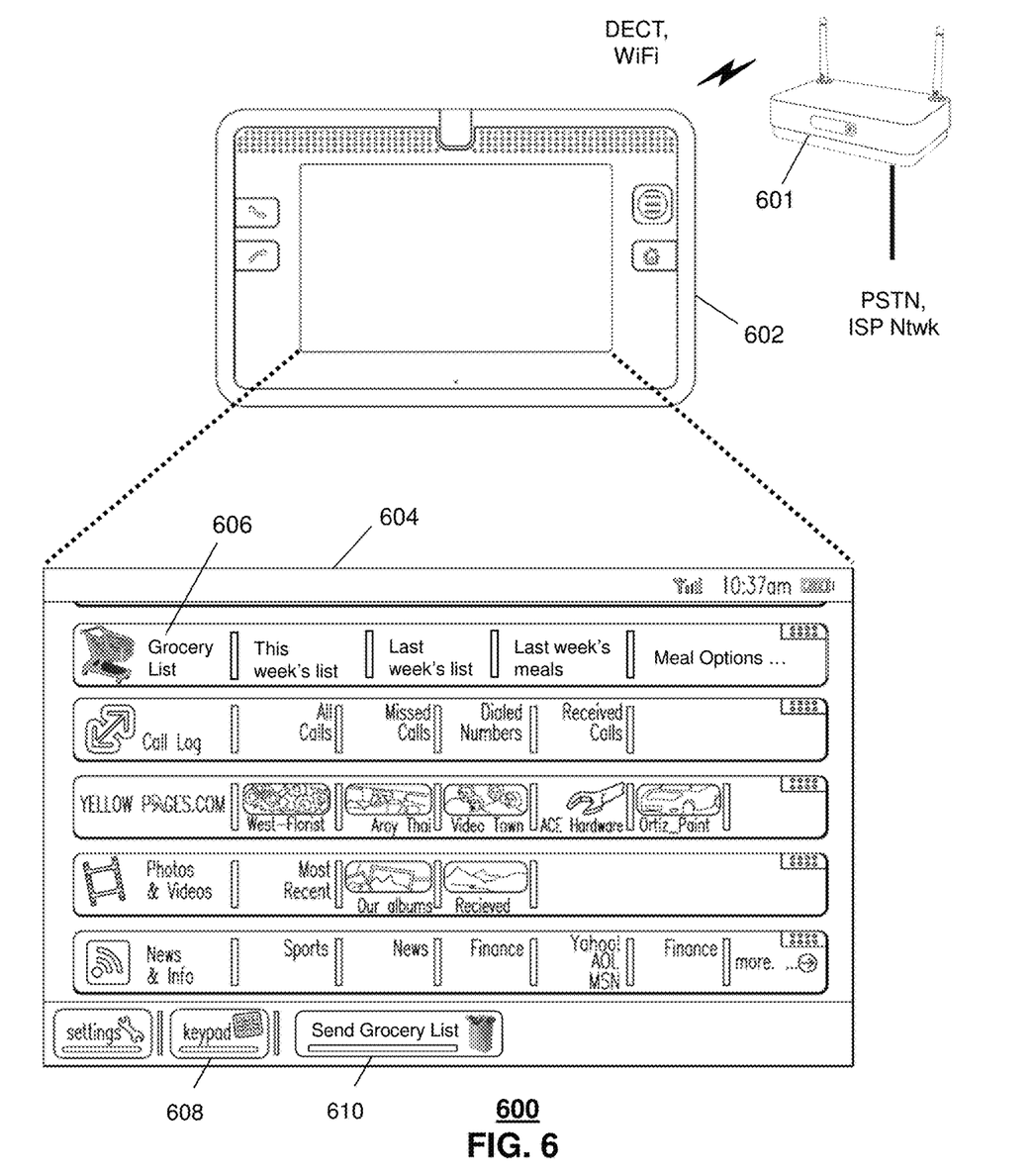
FIG. 6 depicts an illustrative embodiment of a communication device operating according to the method of FIG. 5.

FIG. 5 depicts an illustrative method 500 for managing grocery shopping tasks. Method 500 can begin with step 502 in which a user enters grocery items into a communication device 602 such as shown in FIG. 6. The communication device 602 can be a cordless phone located in the home of the user. The communication device 602 can utilize DECT technology to communicate with a base unit 601 that couple to a PSTN or IMS network as shown in FIG. 2. The communication device 602 can also support WiFi technology for communicating over the ISP network 132 of FIG. 1 by way of the base unit 601.

The communication device 602 can present the user a UI such as reference 604 by way of a touch-sensitive display. The user can select items from the UI 604 and enter alphanumeric characters with a Qwerty keyboard presented in the display which can be invoked by selecting GUI button 608. The UI 604 illustrates by way of example a task bar 606 entitled "Grocery List" which the user can select to enter in step 502 food items to develop a grocery list. While entering items, the grocery list can be recorded by the communication device 602 in step 504.

In step 506 the communication device 602 can retrieve a behavioral profile of the user. The behavioral profile can describe for example the eating habits of the user (and others in his and her family) The behavioral profile can be determined from an analysis of historical grocery lists entered by the user. The communication device 602 can use the behavioral profile to extract possible meal options which may be appetizing to the individual and his/her family The meal options can be retrieved by the communication device 602 from a culinary library system which can operate in one of the communication systems 100-200 of FIGS. 1-2 or from a third party web service accessible over the ISP network 132. The culinary library system can be accessed by the communication device 602 over the WiFi interface of the base unit 601. The culinary library system can utilize common expert system applications to determine from the likes and dislikes of users which meals may be appetizing to the user. The culinary library system can also address special dietary needs based on religious beliefs, health conditions or other special circumstances.

In step 510, the meal options extracted from the culinary library system can be presented by the communication device 602 on the grocery list task bar 606 along with meals and grocery lists from previous weeks. The meal options presented can include images of the proposed meal with a concise description. The meal options can also show the probable cost of the meal per party. If the communication device 602 detects a selection from the meal options in step 512, the communication device can proceed to step 514 where it can retrieve from the culinary library system a recipe for each meal selected. The communication device 602 in this step can query the user as to how many parties will partake in the meal. Based on the number of participants, and the recipe the communication device 602 can generate additional food items for inclusion in the grocery list. The grocery list can also be combined with the individual food items entered in step 502.

In step 516 the user can submit the grocery list to the grocery management system (GMS) 130 described earlier by selecting GUI button 610. If the user does not make this selection, the communication device 602 can continue to develop the user's grocery list as described by steps 502-514. When communication device 602 detects that the user has selected button 610, the communication device transmits the grocery list to the GMS 130 in step 518 by way of the ISP network 132. The GMS 130 can be operated by a single grocery store to serve its patrons. Alternatively, the GMS 130 can serve a plurality of grocery stores which may be independently owned. In the present illustration it is assumed that the GMS 130 is owned and operated by the same grocery store. It is further assumed that the GMS 130 is communicatively coupled to one or more inventory systems of the grocery store which can provide location information for each item placed in grocery store aisles and shelves.

With this in mind, the GMS 130 can be programmed in step 520 to identify the location in the grocery store for each item in the grocery list. The location can be described in any manner. For example the location can be described by an aisle number and shelf location. In more sophisticated applications the location can be supplemented with GPS coordinates. Once the GMS 130 locates each item in the grocery store, the GMS can be programmed in step 522 to determine a selection order for the grocery list to provide an efficient means for shopping the items listed. In this step, the GMS 130 can determine the selection order by distance traveled and time spent grocery shopping by a person using the grocery list. The selection order can also be determined according to the type of food item to be purchased. For example, frozen items such as ice cream can be relocated to the end of the grocery list to minimize exposure time to ambient temperature. Frozen foods and perishable goods such as milk, orange juice and meats can also be moved to the end of the list.

Once an order is selected, the GMS 130 can be programmed in step 524 to retrieve a behavioral profile of the user. The behavioral profile can be the same as the one retrieved in step 506 by the communication device, or a different profile can be created by the GMS 130 from observations of grocery shopping habits of the user. The GMS 130 can use the behavioral profile to identify in step 526 suggestions, advertisements, coupons or promotions for updating the grocery list. The suggestions can represent additional food items not considered by the user.

The GMS 130 can for example track the last time the user shopped for eggs. If it's been more than a week and the GMS 130 detects that eggs are not in the grocery list, the GMS can suggest to the user that eggs may be a desirable item. The suggestion can be combined with an advertisement, coupon or promotion which may or may not be related to the suggestion. For example, the coupon or advertisement may indicate that a certain brand of eggs is selling according to a 2 for 1 discount promotion. Or the advertisement may involve a food item such as sushi bar meals which on prior occasions have been purchased by the user.

In step 528, the GMS 130 updates the grocery list according to the selection order identified in step 522 with the location of each item. In the same step, the grocery list can be updated with the suggestions, advertisements, coupons and/or promotions of step 526. The GMS 130 can then transmit in step 530 the updated grocery list to a device. The device can be a communication device located in the grocery store. The communication device can represent a battery-powered barcode scanner communicatively coupled to the GMS 130 by way of a common wired or wireless communication technology.

Step 530 can be invoked responsive to a signal received by the GMS 130 from the barcode scanner indicating that the user (or an agent of the user) is prepared to use the barcode scanner to engage in grocery shopping. An agent of the user can represent in the present context an employee of the grocery store, or an employee of an agency that performs the grocery shopping tasks for the user. The signal can be initiated by the user/agent by entering a personal identification number (PIN) or some other form of identification by way of the barcode scanner.

Once the GMS 130 programs the barcode scanner with the updated grocery list in step 530, the user/agent can begin to conduct grocery shopping in step 532. While shopping, the barcode scanner can provide the user navigation instructions for each item in the grocery list. The barcode scanner can provide the instructions by way of a display ("Go to aisle 10 to pick up rice. Rice is located half way in the aisle on the middle shelf"). Alternatively the barcode scanner can present the food item using speech synthesis. If the barcode scanner has a GPS receiver which can operate within the grocery store, the navigation instructions can be even more precise. As the user/agent finds each item in the grocery list, the user/agent can scan with the barcode scanner in step 534 the barcode of the item to record its selection. While grocery shopping, the barcode scanner can also present the user the food item suggestions of step 526, which if selected, can provide the user navigation instructions for those items also. The GMS 130 can also organize the suggestions so that their location coincide with the location of other items in the updated grocery list.

Once the user/agent has found all items of interest in the grocery list, the user/agent can present the barcode scanner in step 536 to a fulfillment system such as a common point of sale (POS) terminal. The barcode scanner and the POS terminal can be communicatively coupled by wired or wireless technology for downloading the items selected and for charging the user the groceries purchased using a credit card or debit card. The POS terminal can also take into account coupons or promotions supplied to the user by the GMS 130. When shopping is performed by an agent of the user, the agent can deliver the groceries to the user's establishment in step 538.

Upon reviewing the aforementioned embodiments, it would be evident to an artisan with ordinary skill in the art that said embodiments can be modified, reduced, or enhanced without departing from the scope and spirit of the claims described below. For example, the communication device receiving the updated grocery list in step 520 can be a communication device of the user (such as a cellular phone). The cellular phone can receive the updated grocery list over the cellular network as a short message system (SMS) or multimedia message system (MMS) message, or some other suitable format of communication. The user of the cellular phone can navigate through the grocery store according to the selection order and location information provided in the updated grocery list. The user can then approach a POS terminal manned by a clerk for scanning the selected items.

In yet another embodiment, method 500 can be adapted so that it applies to any kind of shopping list for any kind of store. Hence a shopping list can be created for any commodity or retail item. The raw shopping list can be modified according to a selection order determined from a location of each item in a targeted store. The updated list can also include navigation instructions to assist a user in finding an item while in the store. An updated shopping list such as this can improve the shopping experience of the user.

Other suitable modifications can be applied to the present disclosure without departing from the scope of the claims below. Accordingly, the reader is directed to the claims section for a fuller understanding of the breadth and scope of the present disclosure.

Figure 7:
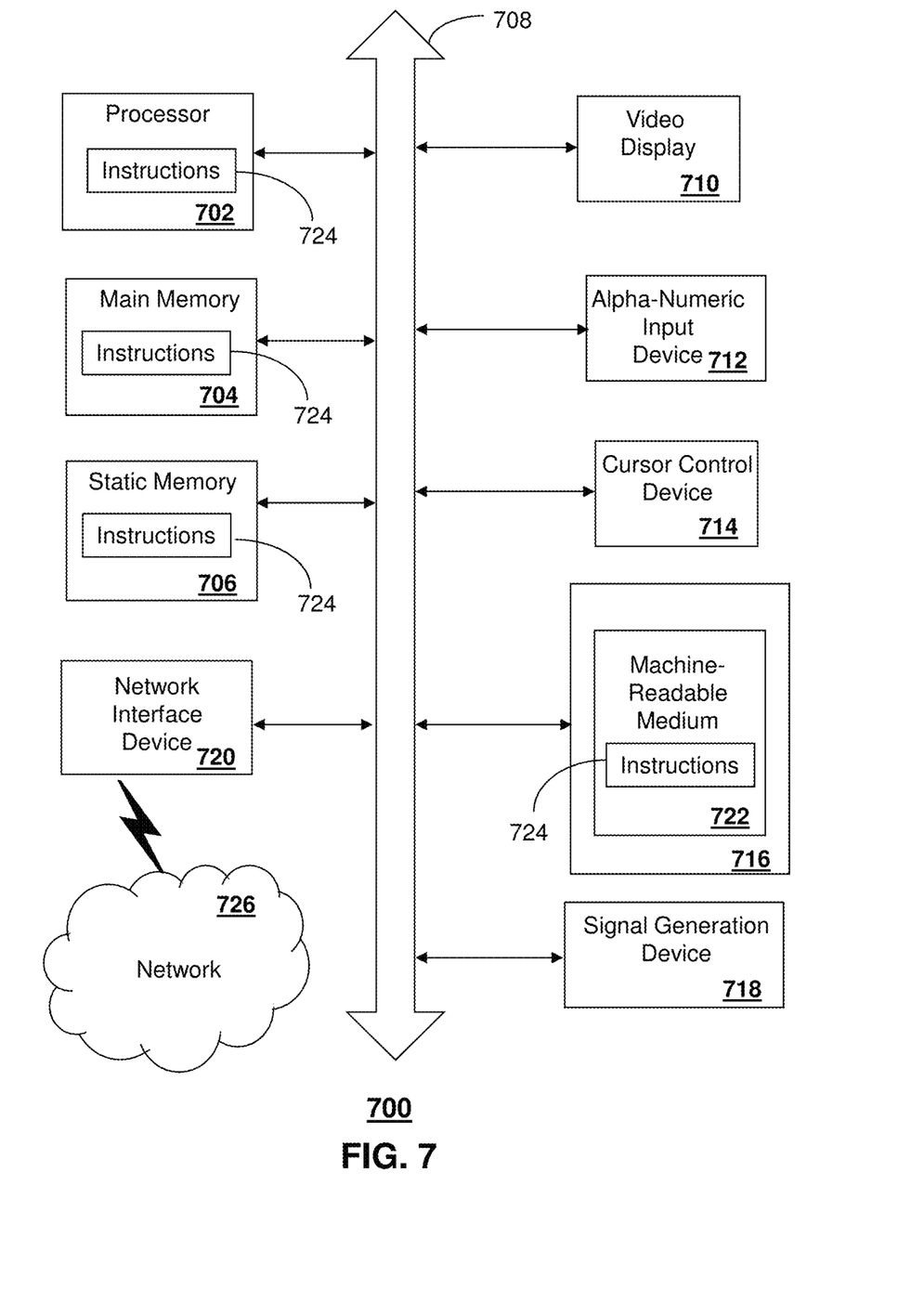
FIG. 7 is a diagrammatic representation of a machine in the form of a computer system within which a set of instructions, when executed, may cause the machine to perform any one or more of the methodologies discussed herein.

FIG. 7 depicts an exemplary diagrammatic representation of a machine in the form of a computer system 700 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both)), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   receiving, by a processing system including a processor, a list of commodity items selected at a communication device, wherein the communication device accesses a first behavioral profile of a user of the communication device, wherein the communication device presents a meal option determined according to the first behavioral profile, wherein the list of commodity items selected at the communication device includes a recipe item associated with a selection of the meal option, and wherein the recipe item is identified according to a recipe library;
   retrieving, by the processing system, a second behavioral profile of the user of the communication device, wherein the second behavioral profile is different from the first behavioral profile;
   determining, by the processing system, an identity of a suggested commodity item according to the second behavioral profile associated with the user of the communication device;
   generating, by the processing system, a shopping list comprising the list of commodity items, the identity of the suggested commodity item, and navigation instructions for locating items of the shopping list, wherein the shopping list is arranged according to relative locations of the items of the shopping list at a shopping premises, and wherein the navigation instructions are further generated according to global positioning system location information associated with the communication device;
   transmitting, by the processing system, the shopping list to the communication device, wherein the communication device presents the navigation instructions via voice synthesis; and
   receiving, by the processing system, scanned data captured at the communication device, wherein the scanned data is associated with a barcode of a first item of the shopping list, and wherein the scanned data is received via a point-of-sale terminal at the shopping premises.

2. The method of claim 1, wherein the shopping list is further arranged to reduce ambient exposure time of the first item of the shopping list, and wherein the communication device presents an image of the meal option.

3. The method of claim 2, wherein the shopping list is further generated in part according to inventory information associated with the shopping premises, and wherein the communication device presents a probable cost of the meal option.

4. The method of claim 3, further comprising facilitating, by the processing system, wireless communications with the communication device, and wherein the selection of the meal option includes a number of servings for the meal option.

5. The method of claim 1, wherein the shopping list is further arranged according to global positioning system coordinates associated with the items of the shopping list at the shopping premises.

6. The method of claim 1, wherein the shopping list is transmitted as a short system message.

7. The method of claim 1, wherein the identity of the suggested commodity item is further determined based on a time lapse from a prior purchase of the suggested commodity item.

8. The method of claim 1, further comprising determining the first behavioral profile according to a past grocery list associated with the user of the communication device.

9. The method of claim 1, further comprising determining the first behavioral profile according to an activity captured at the communication device.

10. The method of claim 1, wherein the global positioning system location information is determined at the communication device.

11. A non-transitory, machine-readable medium having stored therein computer-readable instructions, which when executed by a processing system including a processor, cause the processing system to perform operations comprising:
   receiving a list of commodity items selected at a communication device, wherein the communication device accesses a first behavioral profile of a user of the communication device, wherein the communication device presents a meal option determined according to the first behavioral profile, wherein the list of commodity items selected at the communication device includes a recipe item associated with a selection of the meal option, and wherein the recipe item is identified according to a recipe library;
   retrieving a second behavioral profile of the user of the communication device, wherein the second behavioral profile is different from the first behavioral profile;
   determining an identity of a suggested commodity item according to the second behavioral profile associated with the user of the communication device;
   generating a shopping list comprising the list of commodity items, the identity of the suggested commodity item, and navigation instructions for locating items of the shopping list at a shopping premises, wherein the shopping list is arranged according to relative locations of the items of the shopping list at the shopping premises, and wherein the navigation instructions are further generated according to global positioning system location information associated with the communication device;
   transmitting the shopping list and the navigation instructions to the communication device; and
   receiving scanned data captured at the communication device, wherein the scanned data is associated with a barcode of a first item of the shopping list.

12. The non-transitory, machine-readable medium of claim 11, wherein the global positioning system location information is determined at the communication device, and wherein the communication device presents an image of the meal option.

13. The non-transitory, machine-readable medium of claim 11, wherein the communication device presents the navigation instructions via voice synthesis, wherein the communication device presents a probable cost of the meal option, and wherein the selection of the meal option includes a number of servings for the meal option.

14. The non-transitory, machine-readable medium of claim 11, wherein the scanned data is received via a point-of-sale terminal at the shopping premises.

15. The non-transitory, machine-readable medium of claim 11, wherein the shopping list is further arranged to reduce ambient exposure time of the first item of the shopping list.

16. The non-transitory, machine-readable medium of claim 11, wherein the shopping list is further generated in part according to inventory information associated with the shopping premises.

17. The non-transitory, machine-readable medium of claim 11, wherein the identity of the suggested commodity item is further determined based on a time lapse from a prior purchase of the suggested commodity item.

18. The non-transitory, machine-readable medium of claim 11, wherein the shopping list is further arranged according to global positioning system coordinates associated with the items of the shopping list at the shopping premises.

19. A server device, comprising:
   a processing system including a processor; and
   a memory that stores executable instructions that, when executed by the processing system, facilitate performance of operations, comprising:
      accessing a list of commodity items selected at a communication device, wherein the communication device accesses a first behavioral profile of a user of the communication device, wherein the communication device presents a meal option determined according to the first behavioral profile, wherein the list of commodity items selected at the communication device includes a recipe item associated with a selection of the meal option, and wherein the recipe item is identified according to a recipe library;
      retrieving a second behavioral profile of the user of the communication device, wherein the second behavioral profile is different from the first behavioral profile;
      determining an identity of a suggested commodity item according to the second behavioral profile associated with the user of the communication device;
      generating a shopping list comprising the list of commodity items, the identity of the suggested commodity item, and navigation instructions for locating the items of the shopping list at a shopping premises, wherein the shopping list is arranged according to relative locations of the items of the shopping list at the shopping premises and to reduce ambient exposure time of a first item of the shopping list, and wherein the navigation instructions are further generated according to global positioning system location information associated with the communication device; and
      transmitting the shopping list and the navigation instructions to the communication device.

20. The server device of claim 19, wherein the operations further comprise:
   receiving the list of commodity items selected at the communication device; and
   receiving scanned data captured at the communication device, wherein the scanned data is associated with a barcode of the first item of the shopping list.

* * * * *